(12) United States Patent
Brooks

(10) Patent No.: US 9,282,842 B1
(45) Date of Patent: Mar. 15, 2016

(54) SYSTEM FOR HOLDING DISPENSING BOTTLES

(71) Applicant: Kirby Brooks, North Bay (CA)

(72) Inventor: Kirby Brooks, North Bay (CA)

( * ) Notice: Subject to any disclaimer, the term of this patent is extended or adjusted under 35 U.S.C. 154(b) by 0 days.

(21) Appl. No.: 14/575,559

(22) Filed: Dec. 18, 2014

(51) Int. Cl.
*A47G 1/17* (2006.01)
*A47G 29/093* (2006.01)
*F16M 13/02* (2006.01)

(52) U.S. Cl.
CPC ........... *A47G 29/093* (2013.01); *F16M 13/022* (2013.01)

(58) Field of Classification Search
USPC ............................... 248/206.5, 102, 103, 105
See application file for complete search history.

(56) References Cited

U.S. PATENT DOCUMENTS

| | | | | |
|---|---|---|---|---|
| D212,111 S | * | 8/1968 | Zaretsky | D7/620 |
| 4,721,276 A | * | 1/1988 | Moss | 248/311.2 |
| 5,191,679 A | * | 3/1993 | Harper | 16/363 |
| 5,390,887 A | * | 2/1995 | Campbell | 248/311.2 |
| 5,456,436 A | * | 10/1995 | Faudie | 248/311.2 |
| 5,682,648 A | * | 11/1997 | Miller | 24/5 |
| 5,816,548 A | * | 10/1998 | Blossom, III | 248/206.5 |
| 5,938,160 A | * | 8/1999 | Hartmann et al. | 248/311.2 |
| 6,305,656 B1 | * | 10/2001 | Wemyss | 248/309.4 |
| 6,360,884 B1 | * | 3/2002 | Smith et al. | 206/209.1 |
| 7,445,185 B1 | * | 11/2008 | Cicero | 248/312 |
| 7,959,121 B1 | * | 6/2011 | Barnes, Jr. | 248/311.2 |
| 8,967,562 B1 | * | 3/2015 | Bileth | 248/206.5 |
| 2004/0084593 A1 | * | 5/2004 | Barfield | 248/311.2 |
| 2004/0104320 A1 | * | 6/2004 | Exler | 248/206.5 |
| 2004/0173719 A1 | * | 9/2004 | Mitchell | 248/311.2 |
| 2004/0245415 A1 | * | 12/2004 | Sun | 248/206.5 |
| 2005/0056655 A1 | * | 3/2005 | Gary | 220/737 |
| 2008/0210835 A1 | * | 9/2008 | Bagnall | 248/206.5 |
| 2011/0056437 A1 | * | 3/2011 | Sprung | 119/51.04 |
| 2011/0303808 A1 | * | 12/2011 | Bileth | 248/206.5 |
| 2013/0306119 A1 | * | 11/2013 | Catchings | 135/66 |

* cited by examiner

*Primary Examiner* — Monica Millner
(74) *Attorney, Agent, or Firm* — David W. Barman

(57) ABSTRACT

The present invention is a system for holding a liquid container having a holder constructed and arranged with a bottle support, a bottle retainer member, and a magnet, said holder constructed and arranged such that said magnet provides for mounting said holder on a metallic surface.

4 Claims, 6 Drawing Sheets

SYSTEM FOR HOLDING DISPENSING BOTTLES

BACKGROUND OF THE INVENTION

The use of liquid concentrates that are mixed into drinks at point of use is becoming increasingly popular. However, one difficulty with such dispensers are the storage and easy access. Nobody has designed any type of configuration whereby the liquid concentrate containers are easily accessed, used and returned. The present invention addresses this by providing a metallic holding system whereby the liquid concentrate bottles are stored, selectively used, and returned after use.

SUMMARY OF THE INVENTION

There are many fans of the flavored water additive products being sold. Many people drink more water because of these bottles. Many people are at a loss as to how to keep bottles from companies such as Mio® and others readily useful. The present invention, in one embodiment, includes a holder incorporating a magnet such that the hold attaches to the magnetic door of a refrigerator.

In one embodiment, the system for holding a liquid container, said system comprising: a holder constructed and arranged with a bottle support, a bottle retainer member, and a magnet, said holder constructed and arranged such that said magnet provides for mounting said holder on a metallic surface.

In one embodiment, the magnet is constructed and arranged with size, shape, and magnetic strength to secure said holder and a bottle held therewith, on a magnetic surface. It is not necessary to provide great detail as to size/strength of magnets as they are known in the art. The magnet need to be sized and have magnetic properties to hold the contemplated size bottle and bottle holder system in place on the magnetic surface.

In one embodiment, the bottle retainer is a complete solid loop configured to encircle a bottle held on said bottle support.

In one embodiment, the bottle retainer is a partial solid loop configured to partially encircle a bottle held on said bottle support.

In one embodiment, the bottle retainer is a hook and loop fastener configured to completely encircle a bottle held on said bottle support.

In one embodiment, the magnetic surface is a refrigerator, freezer, or file cabinet.

Also contemplated is method for storing dispensing bottles, said method comprising the steps of:
providing a system according to the invention described herein;
providing a dispensing bottle configured to mate with said system;
placing said bottle on said bottle support;
placing said system on a magnetic surface.

DETAILED DESCRIPTION OF THE PREFERRED EMBODIMENT

Figure 1:
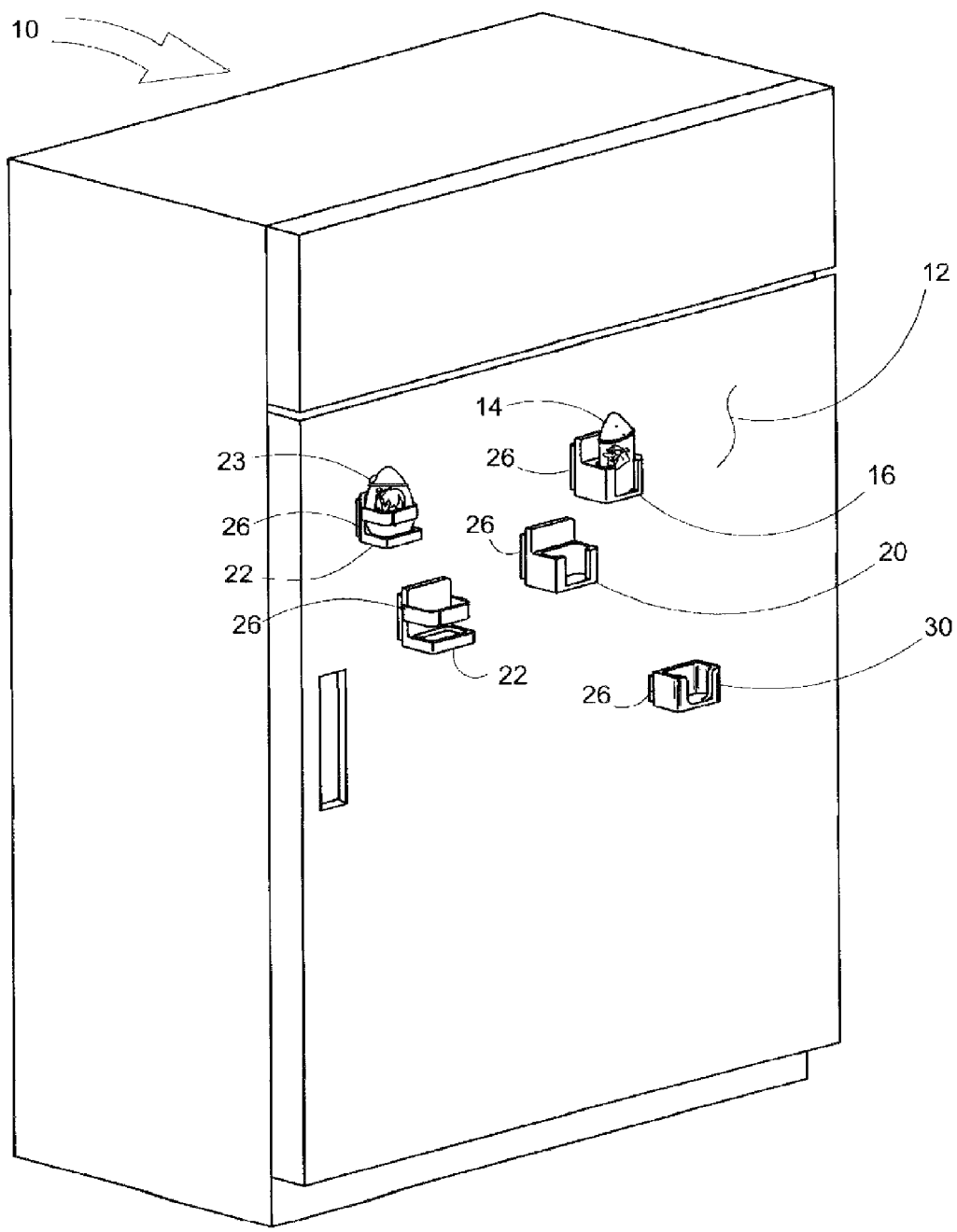
FIG. 1 is a perspective view of various embodiments of the present invention in an environment of use.
Figure 2:
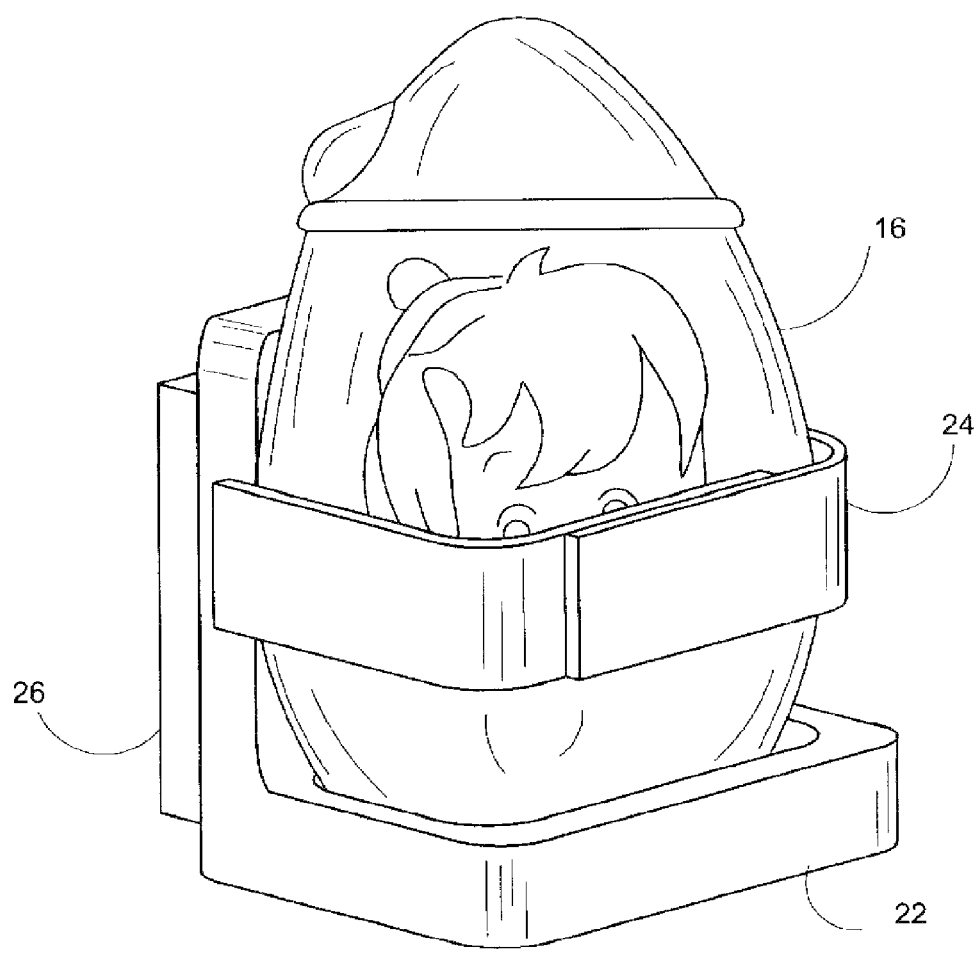
FIG. 2 is a perspective view of one embodiment of the present invention.
Figure 3:
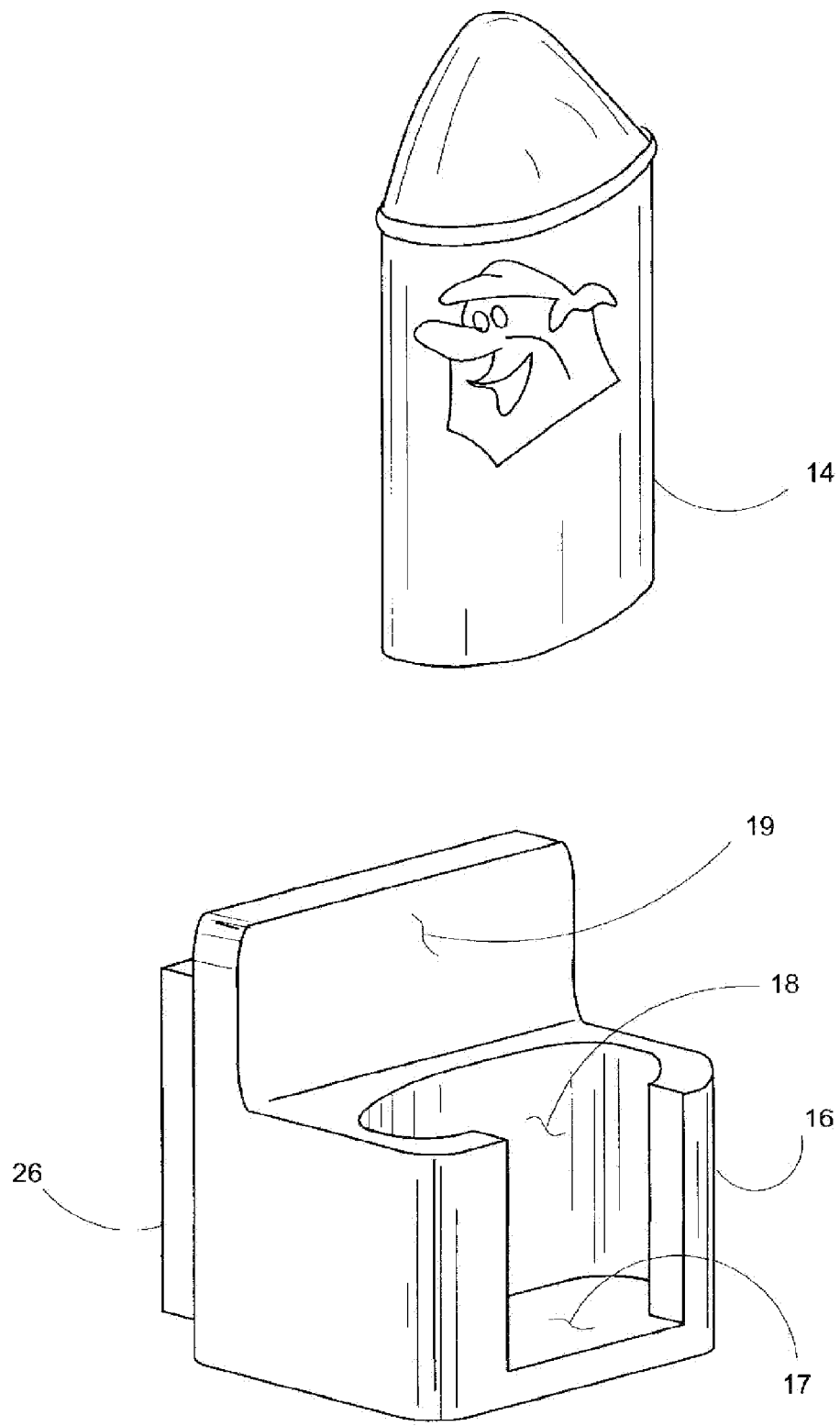
FIG. 3 is a perspective view demonstrating placement of a bottle in a holder according to one embodiment of the present invention.

As generally understood, the present invention involves a system 10 whereby a metallic surface 12 is utilized to hold a holder according to one of the configurations of the present invention. In one embodiment, as demonstrated in FIG. 2, liquid container 16 is nested onto holder stage 22 and secured in place with a flexible fastener 24. In a preferred embodiment, the flexible fastener is a hook and loop system. One common hook and loop system is sold under the name Velcro®. Holder includes a magnetic portion 26 integral therewith and suitable for attaching to a metallic surface 12. In another embodiment according to the present invention, container 14 is mated with a congruous hole cavity receiver 18 as demonstrated in FIG. 3. In this configuration receiver wall 16 partially encircles bottle 14 that rests on receiver floor 17. Although the figures are demonstrative of an embodiment whereby a solid receiver partially encircles the bottle, it is also contemplated an embodiment whereby the body is fully encircled.

Figure 4:
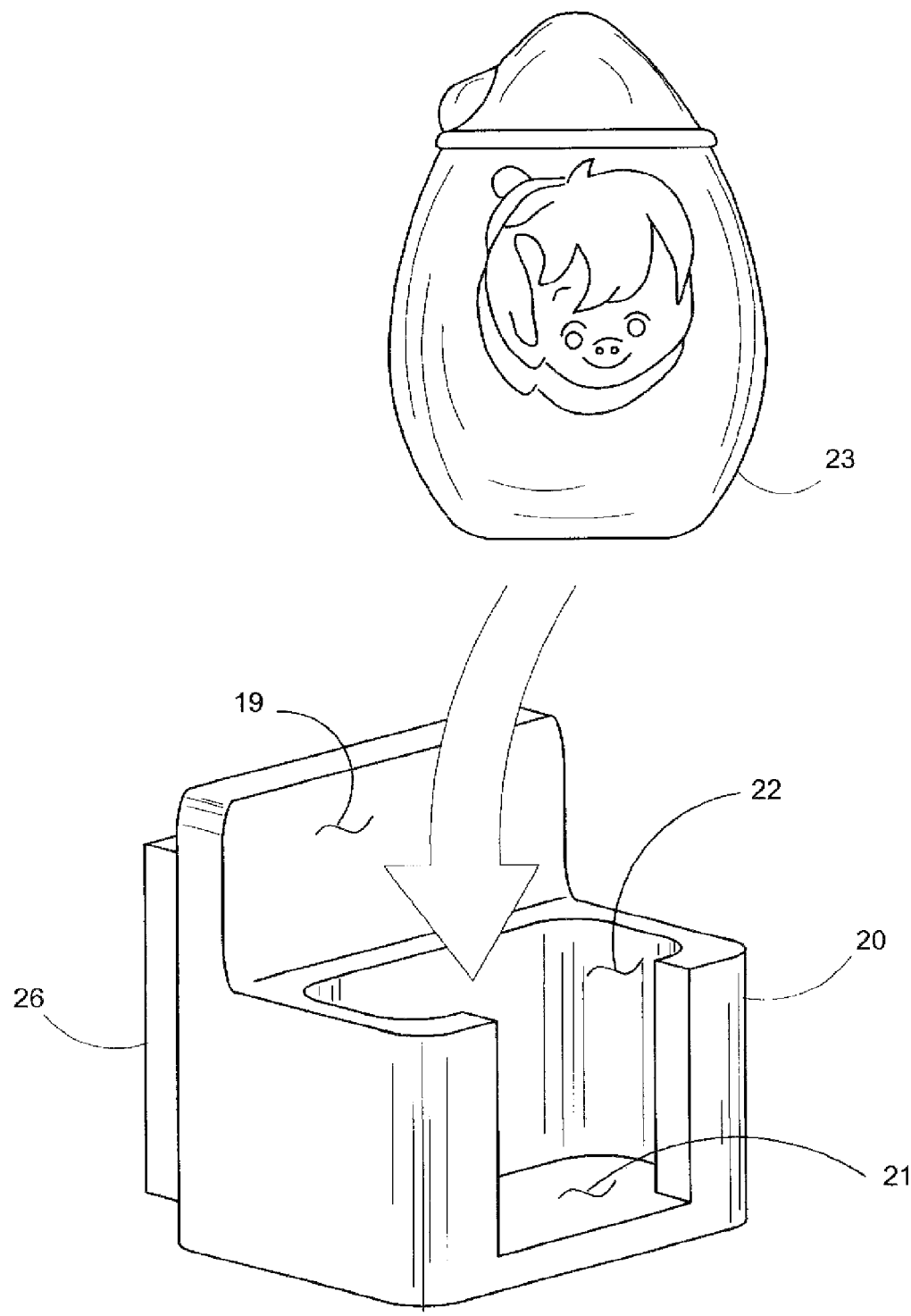
FIG. 4 is a view demonstrating placement of a bottle in a holder according to one embodiment of the present invention.
Figure 5:
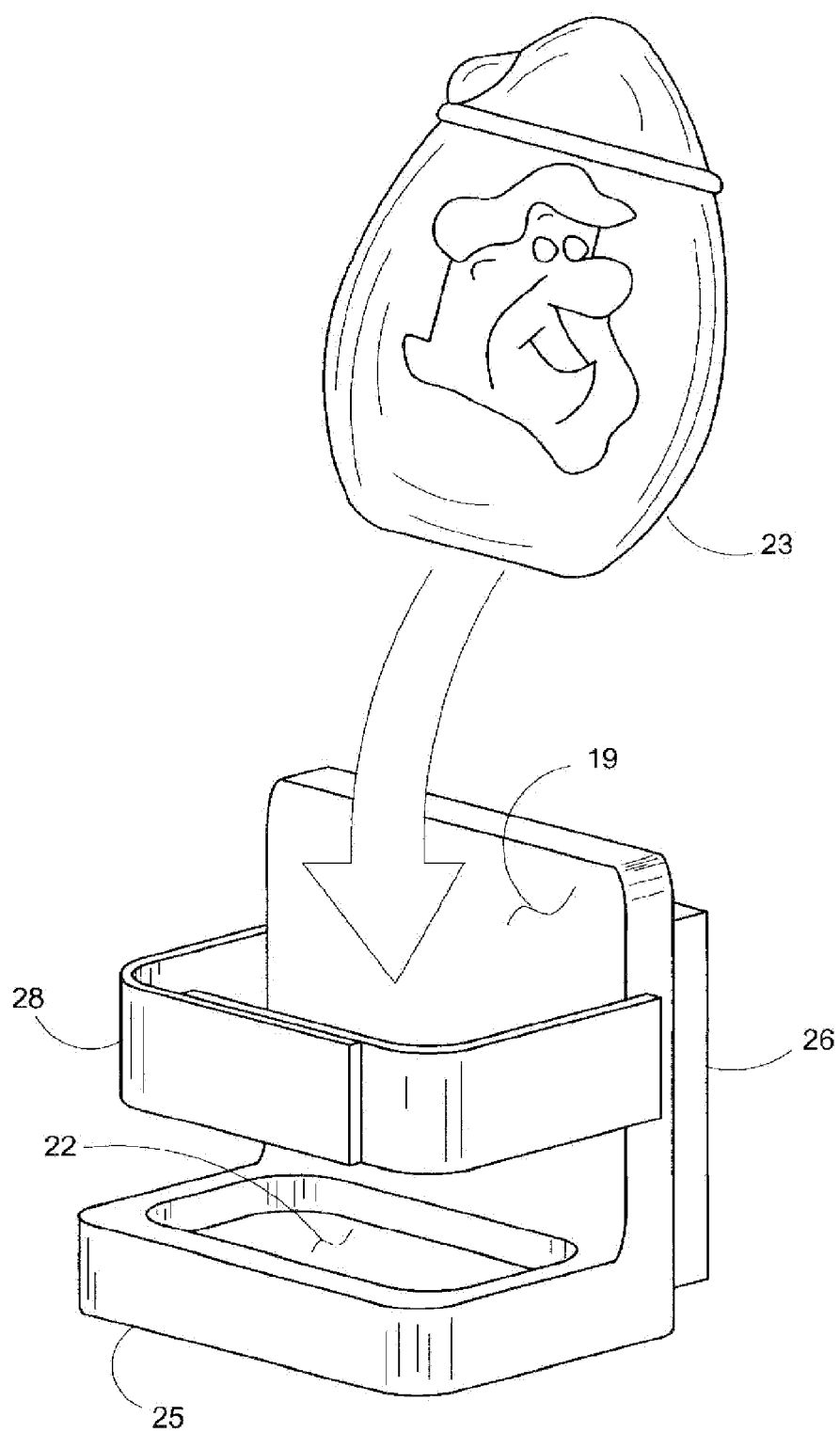
FIG. 5 is a view demonstrating placement of a bottle in a holder according to one embodiment of the present invention.
Figure 6:
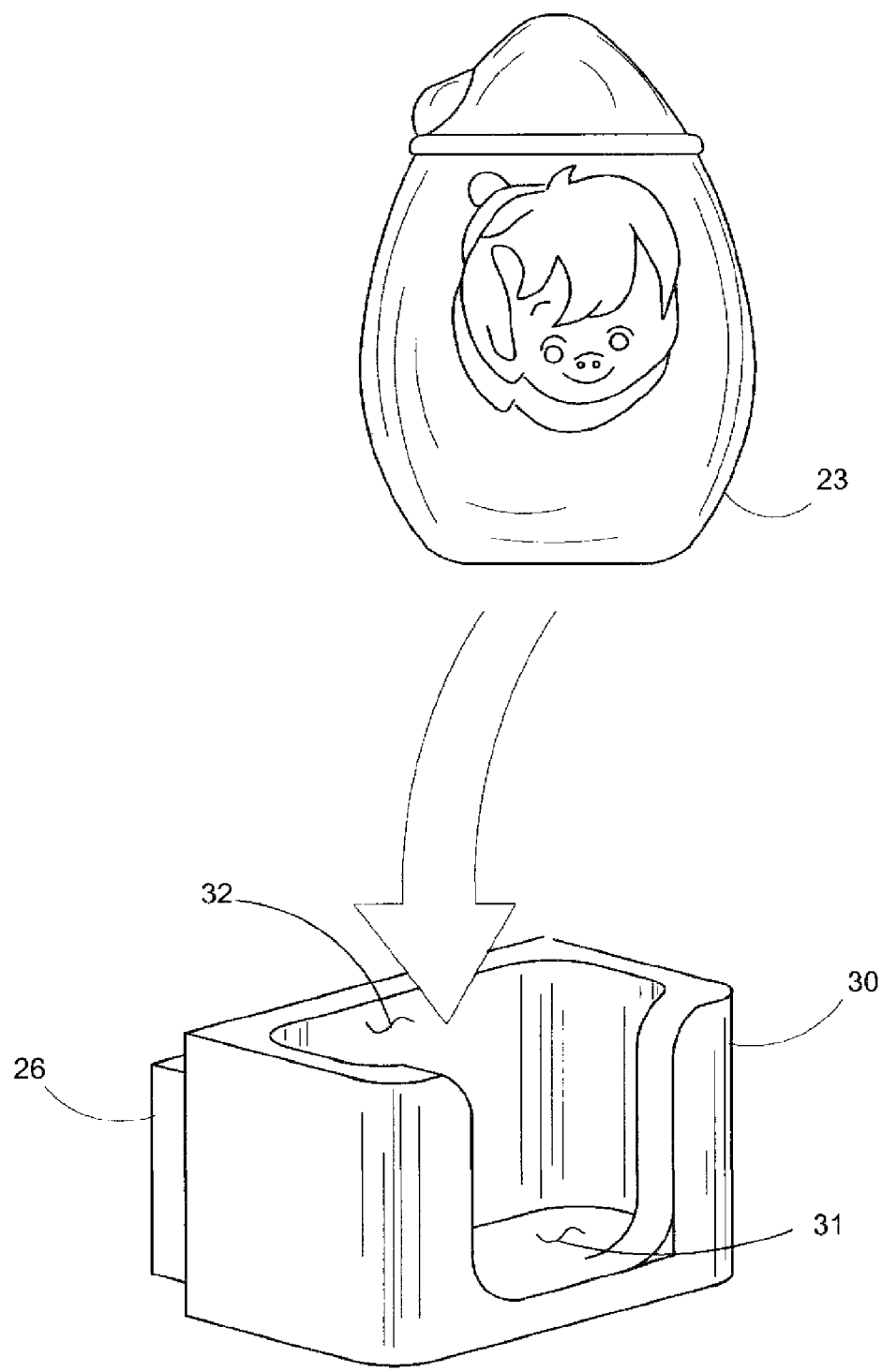
FIG. 6 demonstrates placement of a bottle in a holder according to one embodiment of the present invention.

In use, as generally understood, a user will be provided with an appropriate container such as those demonstrated, but not limited to these containers. In one embodiment of the present invention, as demonstrated in FIG. 4, hole cavity receiver 22 is defined by receiver wall 20 partially encircles bottle 23 that rests on receiver floor 21. This configuration has a configuration particular for bottle geometry of bottle 23. As contemplated, variations congruous with bottle geometry are constructed. In one embodiment of the present invention, as demonstrated in FIG. 5, container 14 will be placed onto floor 22 of base 25 and secured into position with hook and loop fasteners 24. When it is desired to remove container 14, the user will release hook and loop fasteners 24 and remove and use container 14 as desired. In one embodiment of the present invention, as demonstrated in FIG. 6, hole cavity receiver 32 is defined by receiver wall 30 partially encircles bottle 23 that rests on receiver floor 31.

The system of the present invention is particularly useful when utilizing currently popular squeeze bottle concentrates that are typically not refrigerated. These concentrates are most often mixed with water at the time of use. In utilizing the system of the present invention, the magnet 26 will attach to an appropriate metallic surface 12. Metallic surface 12 can be a refrigerator, freezer, file cabinet, or any other metallic surface that will interact with magnet 26 according to the holder of the present invention. The system will provide a simple way to store, access and return container 14 or 16 of the present invention.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. A system for holding a liquid container, said system consisting of: a holder constructed and arranged with a bottle support horizontal base positioned within vertical walls perpendicular to said base, said walls forming a bottle retainer member configured with parallel sides and enveloping more than half of the perimeter of said base; a magnet; a rear wall perpendicular to said base and extending above and upward from behind said vertical walls and having at least a portion of said magnet attached thereto; a liquid container having a face with indicia disposed thereon, structured to nest on said base within said vertical walls; whereby said vertical; walls are open in front to provide visual access to a majority of a said container; face positioned thereon, said holder constructed and arranged such that said magnet provides for mounting said holder on a metallic surface.

2. The system of claim 1 wherein said magnetic is constructed and arranged with size, shape, and magnetic strength to secure said holder and a bottle held therewith, on a magnetic surface.

3. The system of claim 1 wherein said magnetic surface is a refrigerator, freezer, or file cabinet.

4. A method for storing dispensing bottles, said method comprising the steps of:
   providing a system of claim 1;
   providing a dispensing bottle configured to mate with said system;
   placing said bottle on said bottle support;
   placing said system on a magnetic surface.

* * * * *